Patented Oct. 11, 1932

1,882,368

UNITED STATES PATENT OFFICE

ROBERT F. MARSCHNER AND WESLEY C. STOESSER, OF MIDLAND, MICHIGAN, ASSIGNORS TO THE DOW CHEMICAL COMPANY, OF MIDLAND, MICHIGAN, A CORPORATION OF MICHIGAN

DI-DIPHENYL OXIDE

No Drawing.    Application filed March 22, 1930.  Serial No. 438,239.

Our present invention concerns di-diphenyl oxides and the preparation thereof by reacting between a halo-diphenyl and a salt of a phenylphenol.

We have found that the aforementioned di-diphenyl oxides may be prepared according to the following reaction,

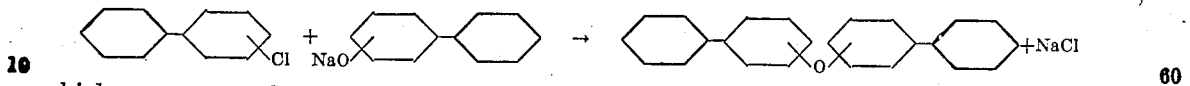

which represents the formation of a di-diphenyl oxide by reacting between a chlorodiphenyl and a sodium phenylphenate. Our invention, then, consists of the features hereinafter fully described and particularly pointed out in the claims, the following description setting forth but several of the various new combinations of matter and giving certain characteristics thereof whereby such compounds may be identified.

The above mentioned reactions may be carried out with or without the addition of a catalyst, such as copper or a suitable alloy thereof, e. g. copper-bronze, and may be carried out in the presence of a medium substantially inert thereto, or the reactants may be extended in an excess of the halo-diphenyl component. Moreover, the process may be operated under any suitable pressure, preferably at atmospheric or increased pressure. The so obtained oxides, which may be obtained in approximately 80–90 per cent. yields, are colorless solids having very high boiling points, are substantially undecomposed at relatively high temperatures, even at the boiling points thereof, are substantially water-insoluble, and are soluble in organic solvents of the nature of chlorobenzene or glacial acetic acid.

The following examples illustrate preferred ways of preparing the new oxides.

Example 1

A mixture of 1 mole sodium para-phenylphenate, 1.75 moles para-bromodiphenyl, and 0.1 mole finely-divided metallic copper was heated in a 250 cc. round-bottomed flask for one-half hour at the boiling point of the bromodiphenyl (about 310° C.). The reaction mass, which was at first solid, gradually liquefied, the organic product thereby formed dissolving in the excess bromodiphenyl. The reaction mixture was cooled to solidification, ground to a powder, and extracted several times with hot dilute aqueous sodium hydroxide solution. The residual solid was washed with hot water to remove soluble matter, dried, and fractionally distilled under reduced pressure. The fraction boiling above approximately 300° C. at 10 millimeters, and which contained the desired oxide, was crystallized twice from chlorobenzene. Di-paradiphenyl oxide, purified as above, melted at 199–200° C., boiled at 463–465° C., and crystallized in small colorless leaflets from chlorobenzene. The yield of crude product was approximately 85 per cent.

Example 2

A mixture of 1 mole sodium ortho-phenylphenate, 1.8 moles ortho-chlorodiphenyl, and 0.1 mole copper powder was heated in an iron bomb at a temperature of approximately 360–380° C. for one hour. The contents of the bomb were removed, boiled with water to remove soluble salts, and extracted with carbon tetrachloride, the extract then being fractionally distilled to obtain the desired product. Di-orthodiphenyl oxide was obtained thereby in an approximately 90 per cent yield. Said compound melts at 117–118° C., boils at 414–416° C., and can be recrystallized from organic solvents such as glacial acetic acid.

Example 3

Di-ortho-para'-diphenyl oxide, melting at 98–100° C. and boiling at 444–446° C., was prepared from sodium ortho-phenylphenate and para-bromodiphenyl in the presence of metallic copper, as described in Example 1. The product, which was obtained in an approximately 80 per cent yield, was recrystallized from acetic acid.

The boiling points of the above products were taken by means of an iron-constantan thermocouple.

The above-mentioned di-diphenyl oxides, or ethers, are useful compounds which may be utilized in cases requiring a relatively high-boiling, inert, and stable material. Moreover, they serve as useful intermediate compounds in the preparation of dyes and pharmaceutical or related products.

Other ways of applying the principle of our invention may be employed instead of the ones explained, change being made as regards the materials, provided the details stated by any of the following claims or the equivalent of such be employed.

We therefore particularly point out and distinctly claim as our invention:—

1. As a new compound, di-(para-para'-diphenyl) oxide having the following formula,

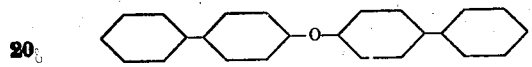

being insoluble in water, soluble in an organic solvent of the nature of chlorobenzene or acetic acid, melting at 199–200° C., and boiling at about 463–465° C. at atmospheric pressure.

2. As a new compound, di-(ortho-ortho'-diphenyl) oxide having the following formula,

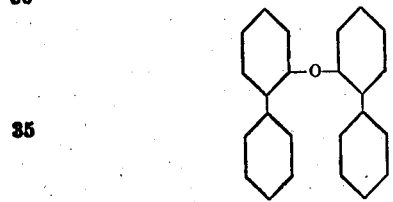

being insoluble in water, soluble in an organic solvent of the nature of chlorobenzene or acetic acid, melting at 117°–118° C., and boiling at about 414°–416° C. at atmospheric pressure.

3. As a new compound, a di-diphenyl oxide having the general formula

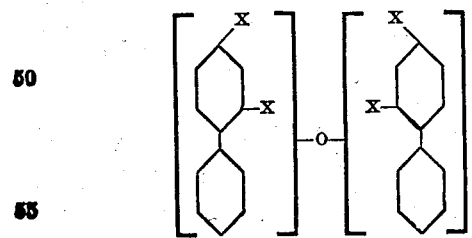

wherein one X, in each diphenyl radical, represents the oxygen linkage and the other X represents a hydrogen, such compound being insoluble in water, soluble in an organic solvent of the nature of chlorobenzene or acetic acid and having a boiling point higher than approximately 400° C. at atmospheric pressure.

4. As a new compound, di-ortho-para'-diphenyl oxide having the following formula

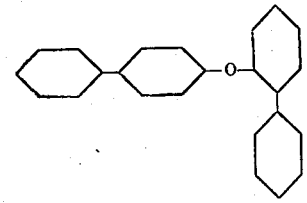

such compound being insoluble in water, soluble in an organic solvent of the nature of chlorobenzene or acetic acid, melting at approximately 98°–100° C. and boiling at approximately 444°–446° C. at atmospheric pressure.

Signed by us, this 19th day of March, 1930.

ROBERT F. MARSCHNER.
WESLEY C. STOESSER.